INDUCTANCE COMPENSATING STRUCTURE

Filed April 15, 1963 2 Sheets-Sheet 1

INVENTORS:
WALLACE J. DUNNET
ALWYN C. SCOTT
RAYNOR W. TAYLOR

BY Spencer E. Olson
ATTORNEY

Aug. 16, 1966 W. J. DUNNET ETAL 3,267,292

INDUCTANCE COMPENSATING STRUCTURE

Filed April 15, 1963 2 Sheets-Sheet 2

INVENTORS:
WALLACE J. DUNNET
ALWYN C. SCOTT
RAYNOR W. TAYLOR

BY Spencer E. Olson
ATTORNEY

United States Patent Office 3,267,292

Patented August 16, 1966

3,267,292

INDUCTANCE COMPENSATING STRUCTURE

Wallace J. Dunnet, Southboro, Mass., Alwyn C. Scott, Madison, Wis., and Raynor W. Taylor, Newton Highlands, Mass., assignors to Sylvania Electric Products Inc., a corporation of Delaware

Filed Apr. 15, 1963, Ser. No. 273,218
8 Claims. (Cl. 307—88.5)

This invention is concerned with electronic circuits and more particularly with the packaging of electronic circuits utilizing tunnel diodes.

Certain characteristics of tunnel diodes make them particularly desirable for use in high speed electronic data processing systems, among them being their ability to operate over wide temperature ranges and to withstand large amounts of nuclear radiation. Their most significant characteristic, however, is their potential capability of operating at very fast speeds since, theoretically speaking, the "quantum mechanical tunneling" of majority carriers across a thin semiconductor junction in the diode will cause a characteristic peak and reverse current occurring at the speed of light. Nevertheless, when tunnel diodes are incorporated in electronic circuits, they never achieve their potential speed capability because of inherent properties of the circuits themselves.

Many circuits which employ two tunnel diodes in adjacent loops have found wide application in the electronic technology of today. Consequently, a great deal of effort is being directed toward improving the speed of operation of such circuits which has heretofore been severely limited by the amount of parasitic inductance in series with the diodes. Hitherto, the only solution offered to this problem has involved the physical shrinking of the circuit dimensions. Since inductance is proportional to the length of connecting wire and the physical size of components, its value can be reduced by reduction of their size. Although operating speed is improved by this method, reduction in size alone will not increase the speed of the circuit to the capability of the tunnel diodes.

An example of a two tunnel diode circuit is the so-called locked pair circuit described in co-pending application Ser. No. 191,502, now abandoned, entitled "Electronic Data Processing," filed by R. Taylor and P. Cotter on May 1, 1962, and also assigned to the assignee of the present application. Briefly, it is a balanced, locked pair network, operating on the majority principle, and comprises a series combination of two tunnel diodes, each of which is connected to a source of sinusoidal power, the polarity of the output signal being determined by the polarity of the resultant algebraic sum of the input signals. Parasitic inductance is present in the lines connecting each tunnel diode to its respective power source, which limits the switching speed of the circuit as explained previously. Using the aforementioned technique of shrinking circuit components, such a circuit might be made to operate in the 100–200 mc. range but it is unlikely that operation above 250 mc. could be realized.

Accordingly, a primary object of the present invention is to increase the maximum operating speeds of electronic circuits utilizing tunnel diodes.

Another object of the invention is to provide a packaging arrangement for electronic circuitry utilizing tunnel diodes which reduces to a minimum the effect of parasitic inductances in such circuits.

A further, more specific object is to provide a packaging arrangement for a tunnel diode locked pair circuit to extend its operating frequency to approximately 1,000 mc.

These and related objects are accomplished in one embodiment of the invention by a physical arrangement of the components of a locked pair circuit such that the conductors containing parasitic inductance are positioned in close physical proximity to effect mutual coupling between them. Thus, whenever current flows in one of these lines, the resulting mutual inductance subtracts from the parasitic inductance in the other to thereby increase the operating speed of the circuit.

The lines containing the parasitic inductances are actually two resistors through which the tunnel diodes are connected to respective signal sources, each of which, in the herein described physical arrangement, is provided by a network of four resistors connected in parallel. These eight resistors are positioned parallel to each other in a cylindrical configuration with a resistor corresponding to one source resistor alternating with ones corresponding to the other source resistor. The two tunnel diodes are stacked and placed within this cylinder. This geometry produces the least parasitic inductance in the lines, which is further reduced by the mutual coupling described above.

Other objects, features and advantages of the invention will become apparent, and its construction and operation better understood, from the following detailed description, read in conjunction with the accompanying drawings, wherein.

*Electrical analysis*

Figure 1:
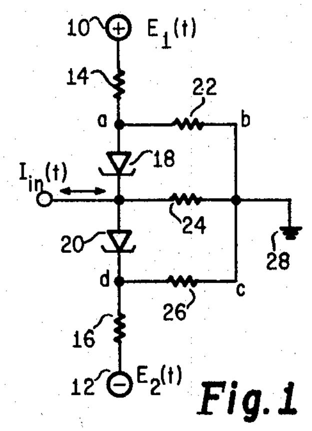
FIG. 1 is a circuit diagram of a typical tunnel diode locked pair circuit to which the invention is particularly applicable.

Although the packing arrangement of the invention has applicability to a variety of tunnel diode pair circuits, it is particularly useful in extending the switching speed of the so-called locked pair circuit and will be described with reference thereto. Referring to FIG. 1, this locked pair circuit includes two sources of alternating current voltage represented by circles 10 and 12. Both sources are of the same frequency and are arranged such that their outputs are 180° out of phase with each other. Accordingly, at any instant when the signal at source 10 is in its positive half cycle, the signal at source 12 is in its negative half cycle. A half cycle later in time, the "polarities" of the sources would be reversed. Input current is received only at a time when source 10 is in its positive half cycle and source 12 is in its negative half cycle as represented by the plus and minus signs, respectively, in the circles of FIG. 1. The circuit further includes a locked pair consisting of tunnel diodes 18 and 20, a first voltage divided network consisting of resistors 14 and 22, a second voltage divider network consisting of resistors 16 and 26, and a load resistor 24, the junction of resistors 22, 24 and 26 being connected to a point of ground potential 28. Resistors 22 and 26 are considerably smaller in value than resistors 14 and 16. The harmful parasitic inductance appears in the path *abcd* and includes the inductance of resistors 22 and 26 of the conductors connecting them to the other elements.

Figure 2:
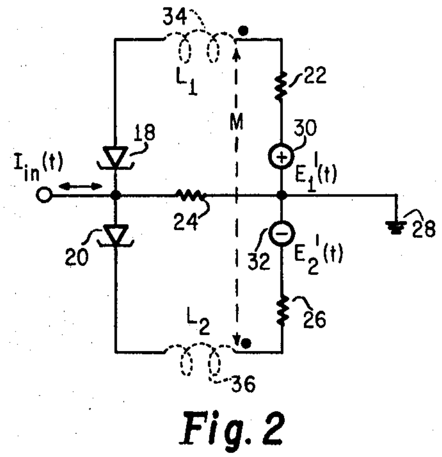
FIGS. 2–4 depict three alternate presentations of the equivalent circuit of the circuit of FIG. 1.

FIG. 2 is an equivalent circuit of FIG. 1 in which the parasitic inductances of the conductors are shown in dotted form at 34 and 36; they are shown this way because they are inherent in the lines rather than being physical components. The value of voltage source 30, $E_1'(t)$, is determined by the first voltage divider and source 10, and the value of voltage source 32, $E_2'(t)$, by the second voltage divider and source 12. The basic operation of the locked pair circuit will now be briefly explained, reference being invited to the aforementioned co-pending application for a more detailed description.

Initially, sources 10 and 12 are turned on, the circuit is in a balanced condition, and no current flows through load resistor 24. When input current is received and it flows toward the junction of tunnel diodes 18 and 20, diode 20 switches and appears as a high impedance. Output current flows from voltage source 30, through resistor 22, inductor 34, tunnel diode 18, and load resistor 24 to ground 28, and a positive pulse is generated. If, however, input current flows out of the junction, tunnel diode 18 will switch, and output current flows from ground through load resistor 24, tunnel diode 20, inductor 36 and resistor 26 to voltage source 32, producing a negative pulse.

The speed at which tunnel diodes 18 and 20 will switch is limited by inductances 34 and 36 as explained in an article by L. Esaki entitled "Characterization of Tunnel Diode Performance in Terms of Device Figure of Merit and Circuit Time Constant," appearing in IBM Journal of Research and Development, April 6, 1962, pp. 170–178. The effective values of inductances 34 and 36 may be reduced by positioning the lines containing these inductances relative to each other so that they are mutually coupled as shown in FIG. 2. When current now flows through inductor 34 during balanced operation, a voltage is induced in inductor 36 which opposes the voltage in this inductor due to the current flow caused by voltage source 32. Similarly, current flow through inductor 36 induces a voltage in inductor 34 which opposes the voltage in it due to voltage source 30. This reduction of voltages across $L_1$ and $L_2$ is equivalent to reducing their inductance values as will be explained with reference to FIGS. 3–5.

Figure 3:
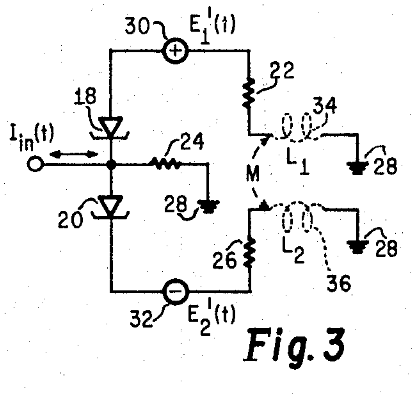
Figure 5:
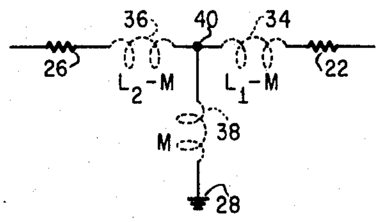
FIG. 5 is the "T" equivalent circuit of a portion of the equivalent circuit of FIG. 3.
Figure 4:
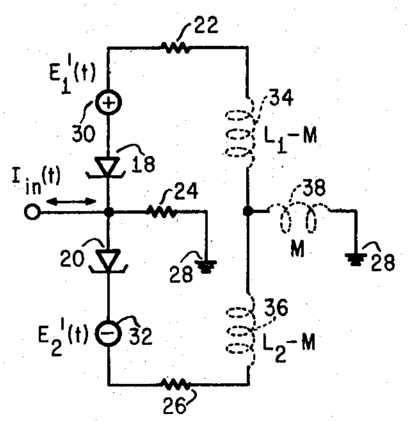

FIG. 3 is equivalent to FIG. 2, but inductances $L_1$, $L_2$, and mutual inductance M have been rearranged so that their "T" equivalent network may readily be formed as shown in FIG. 5. One leg of the "T" comprises inductance 36, whose value is now $L_2-M$, connected between node 40 and resistor 26, a second leg comprises inductance 34 having a value of $L_1-M$ connected between node 40 and resistance 22, and the third leg comprises inductance 38, connected between node 40 and ground and having a value equivalent to mutual inductance M. If perfect coupling were possible, $L_1$, $L_2$, and M would all be equal and the values of inductances 34 and 36 would become zero. FIG. 4 shows this "T" equivalent circuit in the circuit of FIG. 3.

Figure 6:
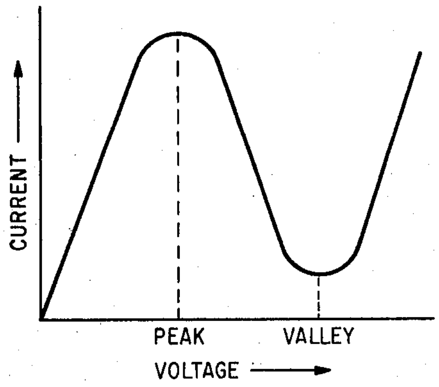
FIG. 6 is the current-voltage characteristic curve of a tunnel diode.

From the foregoing it is apparent that the effect of inductances 34 and 36 is considerably reduced by mutual coupling during balanced operation so that their hindrance of the switching of tunnel diodes 18 and 20 is appreciably reduced when input current, $I_{IN}(t)$, is applied. Mutual inductance 38 does not affect this switching since it is external to the loop. Circuit operation is further aided after tunnel diode switching because mutual coupling increases the voltage in the switched tunnel diode causing it to reach its valley faster and decreases the voltage in the unswitched tunnel diode so it can never reach its peak and switch. The tunnel diode characteristic curve showing the aforementioned peak and valley is depicted in FIG. 6.

*Physical arrangement*

Figure 7:
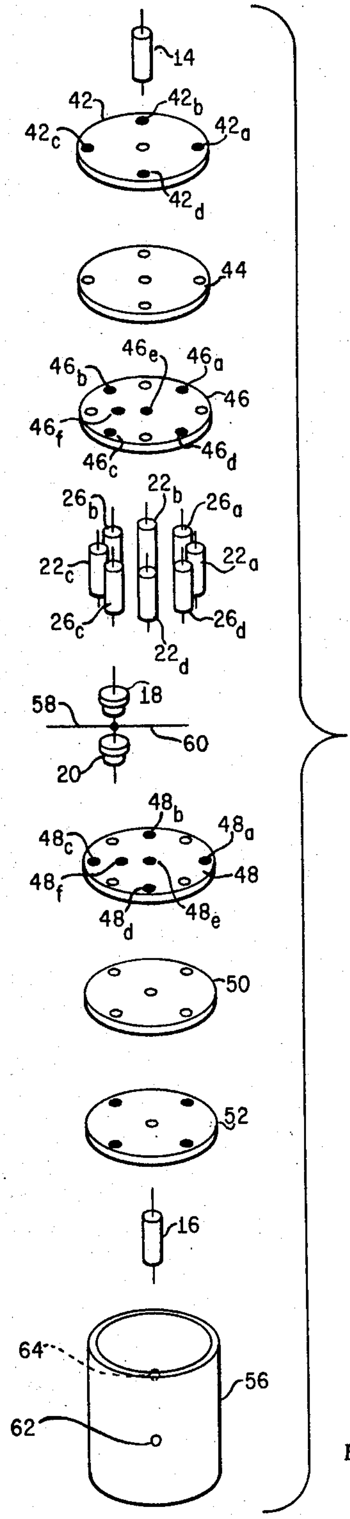
FIG. 7 is an exploded view of the physical assembly, according to the invention, of the components of the circuit of FIG. 1.

An exploded view of a physical arrangement of components for accomplishing the above-described mutual inductance in the locked pair circuit is shown in FIG. 7 wherein like numerals are used to identify the circuit elements of FIG. 1. The components are assembled within a sleeve 56 formed of conducting material, such as brass, the source resistors 14 and 16 extending from opposite ends of the container. To achieve maximum mutual inductance between the inherent inductances of resistors 22 and 26 of FIG. 1, each consists, in the assembly of FIG. 7, of four resistors connected in parallel, those resistors constituting resistor 22 being designated $22_a$, $22_b$, $22_c$ and $22_d$, and those corresponding to resistor 26 being identified as $26_a$, $26_b$, $26_c$ and $26_d$. The resistance value of each of the resistors is selected to make the parallel networks equivalent to the resistance of the single resistors 22 and 26 shown in FIG. 1. For reasons to be explained hereinafter, these resistors are arranged in a cylindrical configuration with each resistor 22 alternating with a resistor 26. The locked diode pair 18 and 20 are closely connected, with input and output connections 58 and 60 respectively connected to the junction of the two diodes and extending in opposite directions therefrom. In the assembly, the diode pair is positioned within the cylindrical configuration of resistors.

The leads extending from the upper ends of resistors $26_a$, $26_b$, $26_c$ and $26_d$ are connected, as by soldering, in respective openings $46_a$, $46_b$, $46_c$ and $46_d$ in a connecting disc 46 formed of conducting material. These openings are shown as a solid black dot to indicate that they are filled with solder when the package is assembled. The upper leads of resistors $22_a$, $22_b$, $22_c$ and $22_d$, on the other hand, extend through insulated clearance holes in disc 46, through holes in an insulating washer 44, and are connected in respective openings $42_a$, $42_b$, $42_c$ and $42_d$ in a second conducting disc 42. The washer 44 insulates disc 42 from disc 44, and disc 42 is of a diameter to contact the inside surface of sleeve 56 when assembled therein; disc 46, however, is of slightly smaller diameter so as not to contact the sleeve. The lower terminal of source resistor 14 extends through an insulated clearance hole in disc 42, through an aligned hole in washer 44, and is connected, as by soldering, in opening $46_e$ in disc 46. From the description thus far, it will be seen that disc 46 provides the junction (point *a* in FIG. 1) between source resistor 14 and resistor 22, and that disc 42 connects the other terminal of resistor 22 (more specifically, the four terminals of parallel-connected resistors $22_a$, $22_b$, $22_c$ and $22_d$) to ground.

Similarly, the leads extending from the lower ends of resistors 22 are connected in openings $48_a$, $48_b$, $48_c$ and $48_d$ in a conductive disc 48, which is insulatedly spaced from the inner surface of the sleeve 56, and the lower leads of resistors 26 extend through clearance holes in disc 48, through holes in an insulating washer 50, and are connected in respective openings $52_a$, $52_b$, $52_c$ and $52_d$ in conductive disc 52. Disc 52 is of a size to contact the inner surface of sleeve 56 to thereby ground one terminal of resistors 26. The upper terminal of source resistor 16 extends through an insulating clearance opening in disc 52, through insulating washer 50 and is connected in opening $48_e$ in disc 48. It will be appreciated that disc 48 corresponds to the junction *d* in the circuit of FIG. 1.

The series combination of tunnel diodes 18 and 20 is positioned within the cylindrical array of resistors, with the unconnected leads thereof respectively connected in openings $46_f$ in disc 46 and $48_f$ in disc 48. Input and output leads 58 and 60 respectively extend through insulating openings 62 and 64 in the wall of sleeve 56, preferably located diametrically opposite from each other. The conductive sleeve 56 encloses the assembly, serves as a magnetic shield for the circuit, and provides a low inductance return path from ground to sources 10 and 12 which would be connected to the exposed terminals of source resistors 14 and 16, respectively.

As mentioned earlier, the resistors 22 and 26 are arranged such that each resistor 22 alternates with a resistor 26. Whenever current flows in resistor 22 of FIG. 1, it actually is divided equally among resistors $22_a$, $22_b$, $22_c$ and $22_d$ in the structure of FIG. 7. The current in each sets up a field of flux around it which induces an opposing voltage in its adjacent resistor 26. Similarly, current flow in resistor 26 in the circuit of FIG. 1 is divided equally among resistors $26_a$, $26_b$, $26_c$ and $26_d$ in the assembly of FIG. 7 causing each to induce opposing voltages in its adjacent resistors 22. The induced mutual inductance reduces the effect of the inherent inductance of the resistors, permitting faster operation of the tunnel diodes, as described above. Although four resistors have been selected for each of resistors 22 and 26 to illustrate the cylindrical arrangement to achieve mutual coupling, the invention is not limited to this number. More nearly perfect mutual coupling can be achieved with a greater number of resistor components.

The annular cylinder arrangement of resistors also has the advantage of providing the optimum geometry for obtaining minimum values of $L_1$ and $L_2$. The inductance of this configuration is proportional to $\log_n b/a$, where $b$ is the outer radius and $a$ is the inner radius of the cylinder, assuming a highly conductive material. Since $\log_n 1$ is zero, minimum impedance would be afforded by a cylinder whose inner radius is almost equal to its outer radius. This could be best achieved by a very thin annular cylinder wherein metallic resistances are deposited on its inner and outer surfaces.

Although the balanced locked pair circuit has been described with reference to the preferred embodiment, the invention is not limited to such a circuit. Any circuit employing two tunnel diodes in adjacent loops can utilize the concept of mutually coupling parasitic inductances to improve its speed. A few examples are the unbalanced locked pair, the "push-pull" high frequency oscillator, video to binary conversion circuits, and logic circuits. In the case of the unbalanced locked pair circuit, each of resistors 22 may be replaced by a parallel network of line conductors, or if the thin annular cylinder is used, the inner resistive metallic coating could be replaced by a conducting metallic coating.

Accordingly, the invention is not limited to the specifics of the preceding description and accompanying drawings but embraces the full scope of the following claims.

What is claimed is:

1. For an electronic circuit having a first conductor containing parasitic inductance and a second conductor containing parasitic inductance, a physical arrangement comprising: a first parallel network equivalent to said first conductor and having at least two conductors; a second parallel network equivalent to said second conductor and having at least two conductors; means supporting said parallel network conductors to form an annular cylinder configuration wherein a conductor of said first network alternates with a conductor of said second network.

2. For an electronic circuit having a first conductor containing resistance and parasitic inductance and a second conductor containing resistance and parasitic inductance, a physical arrangement comprising: a first parallel network equivalent to the resistance value of said first conductor and having at least two resistor components; a second parallel network equivalent to the resistance value of said second conductor and having at least two resistor components; means supporting said parallel network resistor components to form an annular cylinder configuration wherein a resistor component of said first network alternates with a resistor component of said second network.

3. A packaging arrangement for a tunnel diode locked pair circuit comprising: first, second, third and fourth conductive discs, a cylindrical array of resistors arranged in first and second groups with one resistor of said first group alternating with one resistor of said second group, the resistors of said first group being connected between said first and said fourth conductive discs, and the resistors of said second group being connected between said second conductive disc and said third conductive disc, a first source resistor connected to said first conductive disc, a second source resistor connected to said third conductive disc, and a tunnel diode locked pair disposed within said array and connected between said first and third conductive discs.

4. An arrangement of components for a locked pair circuit comprising: first, second, third and fourth conductive discs; an annular cylinder arrangement of resistors divided into first and second groups and arranged with one resistor of said first group alternating with one resistor of said second group; the resistors of said first group being connected between said first and fourth discs and the resistors of said second group being connected between said second and third discs; a first source resistor connected to said first disc; a second source resistor connected to said third disc; a tunnel diode locked pair joined at a node and having first and second terminals, said first and second terminals being connected to said first and third discs, respectively; a conductive cylinder enclosing the aforementioned elements; and input and conductors passing through the wall of said cylinder and being connected to said node.

5. Package assembly for an electronic circuit including two tunnel diodes in adjacent first and second loops and wherein each loop includes resistance and parasitic inductance, comprising: a conductive cylindrical sleeve, a plurality of resistors arranged in cylindrical configuration and positioned within said sleeve, a first conductive disc connecting one terminal of alternate ones of said resistors together and to said cylindrical sleeve, a second conductive disc connecting the other terminal of said alternate ones of said resistors together to form a first parallel network having resistance equivalent to the resistance of said first loop, a third conductive disc connecting one terminal of the others of said resistors together and to said cylindrical sleeve, a fourth conductive disc connecting the other terminal of said other resistors together to form a second parallel network having resistance equivalent to the resistance of said second loop, and a tunnel diode locked pair joined at a node and having first and second terminals, said tunnel diode locked pair being disposed within said cylindrical configuration of resistors with said first and second terminals connected to said second and fourth discs, respectively.

6. The assembly of claim 5 wherein said sleeve is formed with first and second openings in the wall thereof, and input and output conductors extending through said first and second openings and connected to said node.

7. For an electronic circuit having two tunnel diodes in adjacent loops, and first and second conductors each containing resistance and parasitic inductance, a physical arrangement comprising: a thin annular cylinder; a first resistor component representing said first conductor and comprising a resistive material deposited on the inner surface of said thin annular cylinder; and a second resistor component representing said second conductor and comprising a resistive material deposited on the outer surface of said thin annular cylinder, whereby, due to the mutual inductance between said first and second resistor components, a current flow in one of said resistor components induces a voltage into the other resistor component tending to cancel the voltage induced into said other resistor component because of its parasitic inductance.

8. For an electronic circuit having two tunnel diodes in adjacent loops, and first and second conductors each containing resistance and parasitic inductance, a physical configuration comprising: at least one first resistive means equivalent to said first conductor and formed on the inner surface of a thin annular cylinder, at least one second resistive means equivalent to said second conductor and formed on the outer surface of said annular cylinder, whereby a current flow in said first resistive means induces a voltage into said second resistive means tending to cancel the voltage induced into said second resistive means because of its parasitic inductance.

References Cited by the Examiner

UNITED STATES PATENTS 2,026,308 12/1935 Ganz ---------------- 179—78

OTHER REFERENCES

IBM Technical Disclosure Bulletin, Esaki Diode Binary Trigger, Meyers, vol. 3, No. 9, September 1961, pp. 32 and 33.

ARTHUR GAUSS, *Primary Examiner.*

B. P. DAVIS, *Assistant Examiner.*